United States Patent
Chang

(10) Patent No.: US 12,214,701 B2
(45) Date of Patent: Feb. 4, 2025

(54) RECLINER FOR VEHICLE

(71) Applicant: Hyundai Transys Incorporated, Seosan-si (KR)

(72) Inventor: Seung Hun Chang, Hwaseong-si (KR)

(73) Assignee: Hyundai Transys Incorporated, Seosan-si (KR)

( * ) Notice: Subject to any disclaimer, the term of this patent is extended or adjusted under 35 U.S.C. 154(b) by 372 days.

(21) Appl. No.: 17/961,664

(22) Filed: Oct. 7, 2022

(65) Prior Publication Data
US 2023/0116979 A1   Apr. 20, 2023

(30) Foreign Application Priority Data
Oct. 15, 2021   (KR) ................. 10-2021-0137693

(51) Int. Cl.
*B60N 2/22*   (2006.01)
*B60N 2/20*   (2006.01)
*B60N 2/225*   (2006.01)

(52) U.S. Cl.
CPC ............. *B60N 2/20* (2013.01); *B60N 2/225* (2013.01); *B60N 2/2251* (2013.01); *B60N 2/2252* (2013.01); *B60N 2/2254* (2013.01)

(58) Field of Classification Search
CPC ........ B60N 2/20; B60N 2/225; B60N 2/2251; B60N 2/2254; B60N 2/2252
See application file for complete search history.

(56) References Cited

U.S. PATENT DOCUMENTS

| | | | | |
|---|---|---|---|---|
| 8,444,521 | B2 * | 5/2013 | Krueger | B60N 2/2252 475/162 |
| 8,944,508 | B2 * | 2/2015 | Ohba | B60N 2/2254 297/362 |
| 11,407,337 | B2 * | 8/2022 | Lee | B60N 2/2252 |
| 2011/0227386 | A1 * | 9/2011 | Berndtson | B60N 2/22 297/354.1 |

FOREIGN PATENT DOCUMENTS

| | | |
|---|---|---|
| DE | 10-2004-007043 B3 | 6/2005 |
| KR | 10-1003718 B1 | 12/2010 |
| KR | 10-2012-0049333 A | 5/2012 |
| KR | 10-1711826 B1 | 3/2017 |
| KR | 10-2070023 B1 | 1/2020 |
| KR | 102216952 B1 | 2/2021 |
| KR | 102236705 B1 | 4/2021 |
| WO | 2011019904 A1 | 2/2011 |

* cited by examiner

*Primary Examiner* — Syed A Islam
(74) *Attorney, Agent, or Firm* — Bridgeway IP Law Group, PLLC; Jihun Kim

(57) ABSTRACT

Proposed is a recliner for a vehicle, the recliner including a mobile flange including a support portion having a multi-stage structure having stages with different outer diameters, an eccentric ring installed in a seating space of the mobile flange by being fitted with the support portion of the mobile flange, the eccentric ring including a corresponding end corresponding to the multistage structure of the support portion and formed on an inner surface being in contact with the support portion, a gear plate including an external gear configured to engage with the internal gear of the mobile flange, and a cam disposed between the eccentric ring and the gear plate and configured to press the gear plate to one side.

11 Claims, 4 Drawing Sheets

RECLINER FOR VEHICLE

CROSS REFERENCE TO RELATED APPLICATION

The present application claims priority to Korean Patent Application No. 10-2021-0137693, filed Oct. 15, 2021, the entire contents of which is incorporated herein for all purposes by this reference.

BACKGROUND OF THE DISCLOSURE

Field of the Disclosure

The present disclosure relates to a recliner for a vehicle, in which a multistage structure is formed, by a comparatively simple process, on a support portion for supporting an eccentric ring of a mobile flange, and a corresponding end structure is also formed on the corresponding eccentric ring, thereby increasing strength of the recliner, reducing weight and size, and reducing manufacturing costs.

Description of the Related Art

A recliner for a vehicle includes: a mobile flange that has an internal gear; a gear plate that is eccentric in the mobile flange and has an external gear engaging with the internal gear; and an eccentric ring and a cam that induce eccentricity of the gear plate.

Meanwhile, the recliner essentially has resistance strength against a load of a passenger or a load occurring in the event of a vehicle collision. To this end, it is necessary to ensure a stable engagement area between the internal gear and the external gear and allow the internal gear and the external gear to come into surface contact with each other while engaging with each other.

In addition, the mobile flange of the recliner is sometimes manufactured by a forging process to ensure strength. However, there are problems in that manufacturing costs are very high, and the recliner is heavy. Meanwhile, the manufacturing costs are low when the shape is formed through a fine blanking process. However, there is a limitation in implementing a thickness required for a desired point on the mobile flange because of a limitation in forming the mobile flange.

KR 10-2236705 B1, which is the related art, discloses a configuration in which a cam sleeve is disposed between an inner surface of a cam and a support portion of a mobile flange to ensure the strength of a recliner. However, when the verticality of the cam is changed and thus the cam is inclined even slightly, the surface contact between the mobile flange and the cam sleeve is released and immediately changed to the point contact, which causes abnormal abrasion. For this reason, there is a problem in that an operating force deteriorates, and required engagement strength also remarkably deteriorates.

It is necessary to more precisely manage manufacturing tolerance to prevent the above-mentioned situation, but it is, in practice, impossible to manage the tolerance to accurately ensure the verticality of the cam. In addition, it is challenging to implement tolerance management because it is impossible to prevent fine deformation caused by an excessive operating force during a manufacturing process.

The foregoing explained as the background is intended merely to aid in the understanding of the background of the present disclosure, and is not intended to mean that the present disclosure falls within the purview of the related art that is already known to those skilled in the art.

SUMMARY

The present disclosure is proposed to solve these problems and aims to provide a recliner for a vehicle, in which a multistage structure is formed, by a comparatively simple process, on a support portion for supporting an eccentric ring of a mobile flange, and a corresponding end structure is also formed on the corresponding eccentric ring, thereby increasing strength of the recliner, reducing weight and size, and reducing manufacturing costs.

To achieve the above-mentioned object, the present disclosure provides a recliner for a vehicle, the recliner including: a mobile flange opened at an upper side thereof and including a seating space formed therein, an internal gear formed on an inner surface that defines the seating space, and a support portion formed at a center of the seating space and protruding upward from a lower surface, the support portion having a multistage structure having stages with different outer diameters; an eccentric ring installed in the seating space of the mobile flange by being fitted with the support portion of the mobile flange, the eccentric ring including a corresponding end corresponding to the multistage structure of the support portion and formed on an inner surface being in contact with the support portion; a gear plate disposed in the seating space of the mobile flange and including an external gear formed on an outer peripheral surface thereof, the external gear being configured to engage with the internal gear of the mobile flange; and a cam disposed between the eccentric ring and the gear plate and configured to press the gear plate to one side.

A through-hole may be formed at a center of the lower surface of the mobile flange, and the support portion may extend upward from a rim of the through-hole.

The support portion may be formed integrally with the mobile flange through a fine blanking process.

The support portion may include a lower end, and an upper end disposed at an upper side of the lower end, and the lower end may have a larger outer diameter than the upper end.

A through-hole may be formed at a center of the lower surface of the mobile flange, the lower end may be formed inside the through-hole, and the upper end may be formed inside the lower end.

A through-hole may be formed at a center of the lower surface of the mobile flange, the lower end may be formed at a point offset upward in the through-hole to protrude upward from the lower surface of the mobile flange, and the upper end may be formed at a point offset upward in the lower end to protrude upward from the lower end.

A lower end of the mobile flange may have a flat plate shape.

The corresponding end of the eccentric ring may be formed as a lower portion of the inner surface of the eccentric ring, which adjoins the support portion, and is recessed.

A lateral surface of the corresponding end of the eccentric ring may be offset outward in a radial direction from an inner end of the eccentric ring.

A lateral surface of the corresponding end of the eccentric ring and an inner end of the eccentric ring may face lateral surfaces of the multistage structure of the support portion, respectively.

The corresponding end of the eccentric ring may have a ring shape formed as an inner lower portion of the eccentric ring and is recessed.

According to the recliner for a vehicle according to the present disclosure, the multistage structure may be formed, by a comparatively simple process, on the support portion for supporting the eccentric ring of the mobile flange, and the corresponding end structure may also be formed on the corresponding eccentric ring, thereby increasing strength of the recliner, reducing weight and size, and reducing manufacturing costs.

DETAILED DESCRIPTION

The present disclosure relates to a recliner for a vehicle, in which a multistage structure is formed, by a comparatively simple process, on a support portion for supporting an eccentric ring of a mobile flange, and a corresponding end structure is also formed on the corresponding eccentric ring, thereby increasing strength of the recliner, reducing weight and size, and reducing manufacturing costs.

Figure 1:
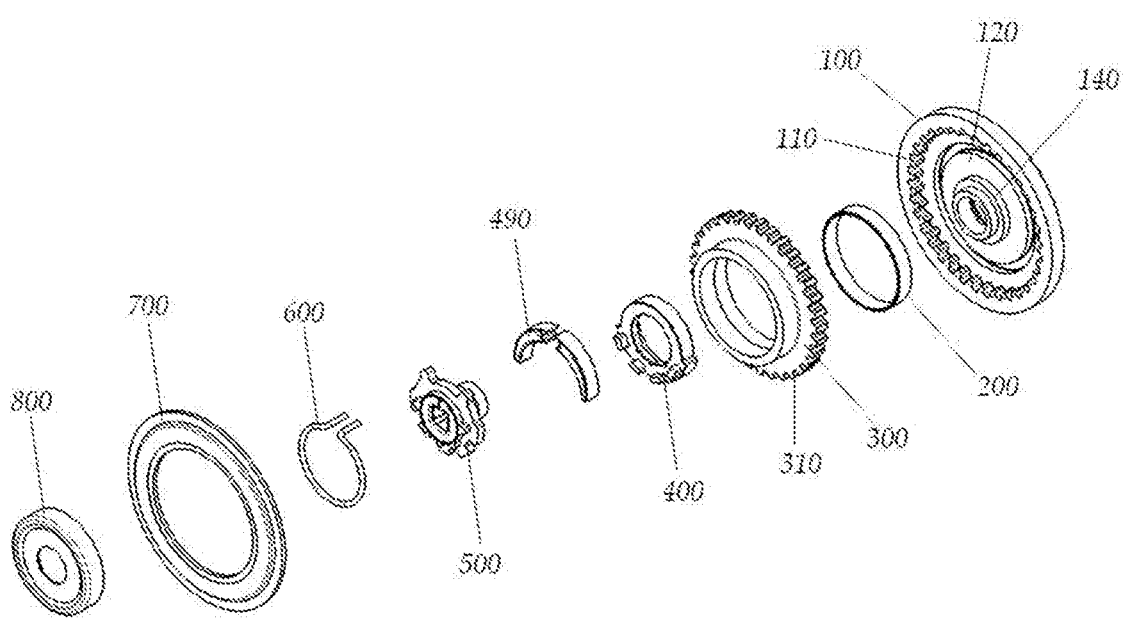
FIG. 1 is an exploded perspective view of a recliner for a vehicle according to an embodiment of the present disclosure.
Figure 2:
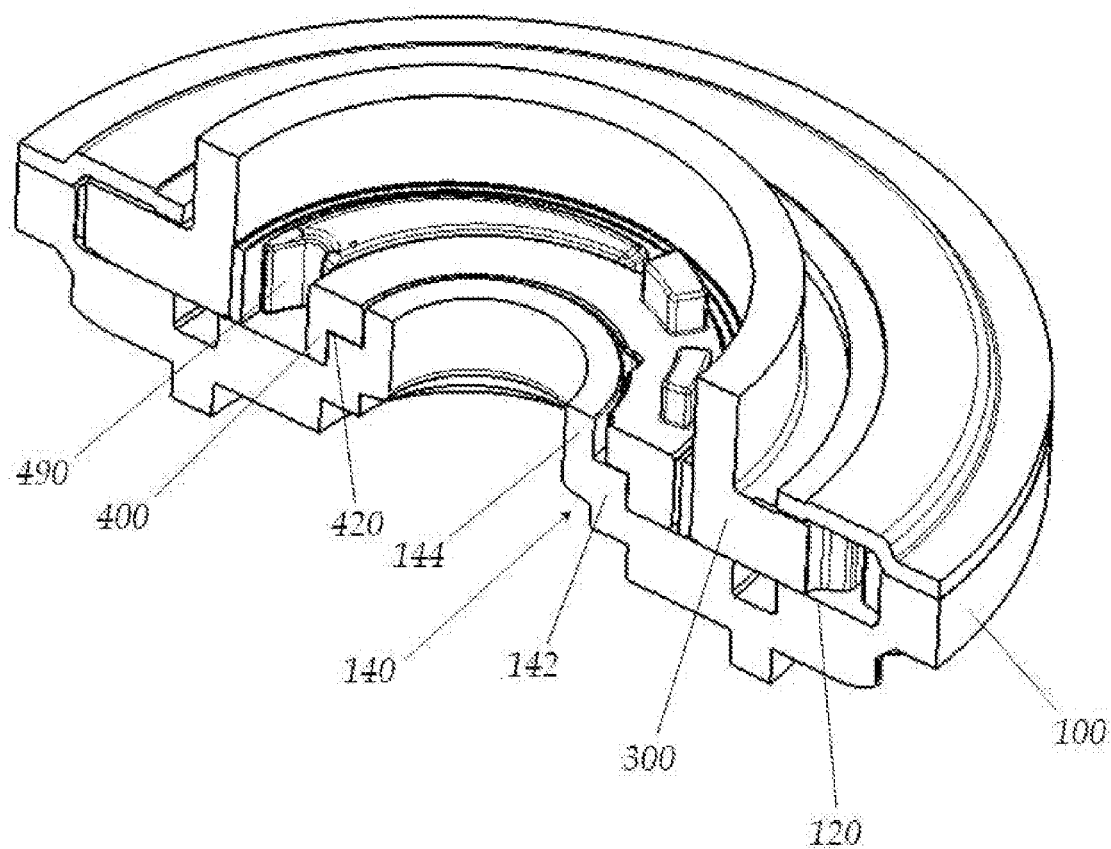
FIG. 2 is a view illustrating a state in which the recliner for a vehicle according to the embodiment of the present disclosure is assembled.
Figure 3:
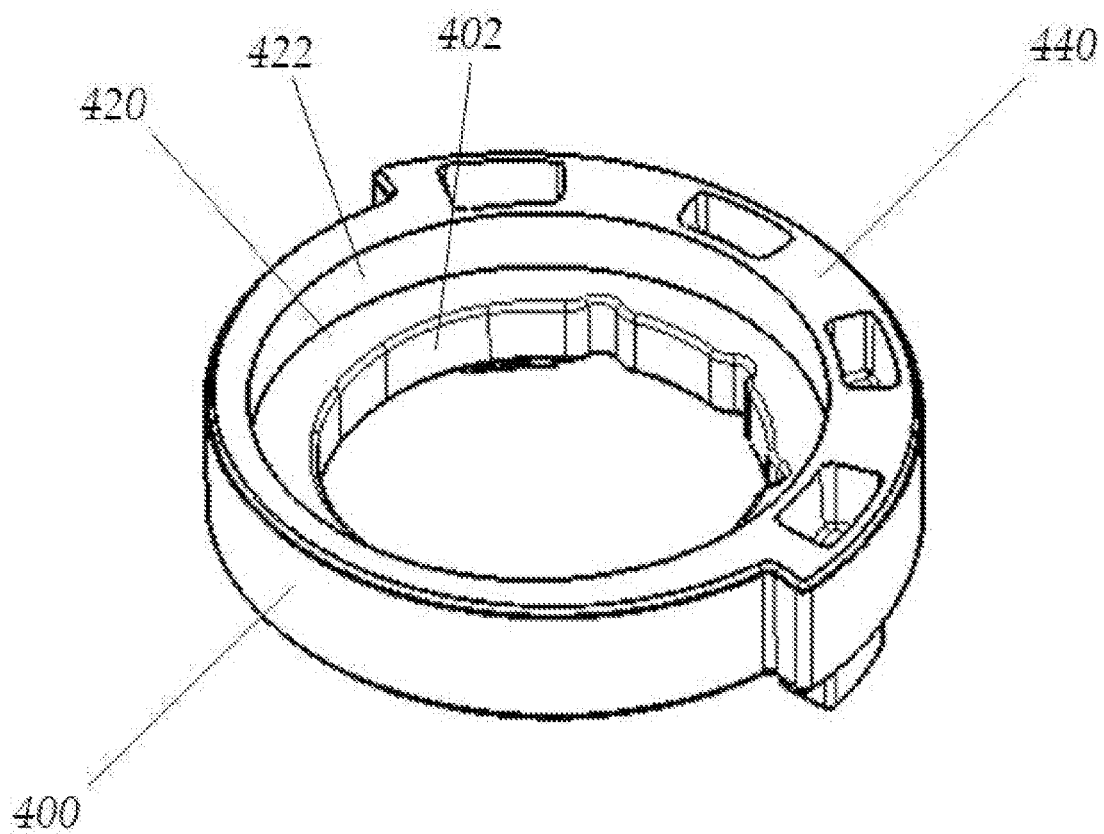
FIG. 3 is a view illustrating an eccentric ring of the recliner for a vehicle according to the embodiment of the present disclosure.
Figure 4:
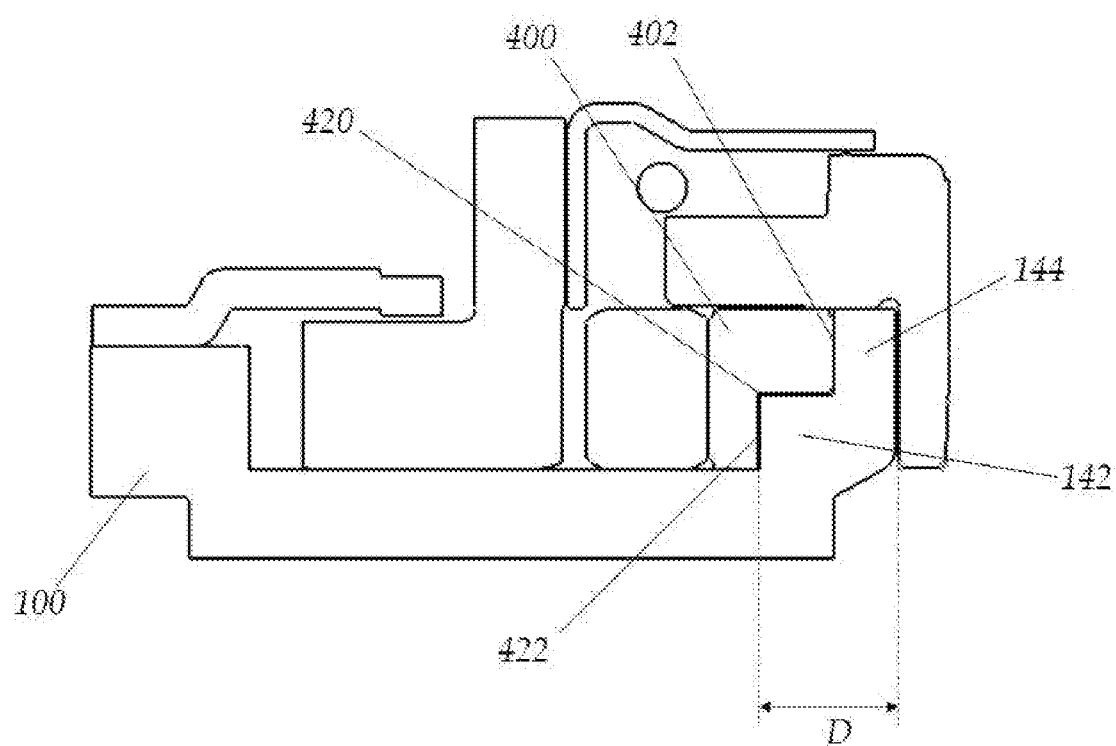
FIG. 4 is a cross-sectional side view of the recliner for a vehicle according to the embodiment of the present disclosure.

FIG. 1 is an exploded perspective view of a recliner for a vehicle according to an embodiment of the present disclosure, FIG. 2 is a view illustrating a state in which the recliner for a vehicle according to the embodiment of the present disclosure is assembled, FIG. 3 is a view illustrating an eccentric ring of the recliner for a vehicle according to the embodiment of the present disclosure, and FIG. 4 is a cross-sectional side view of the recliner for a vehicle according to the embodiment of the present disclosure.

First, a recliner according to the present disclosure will be described with reference to FIGS. 1, 3, and 4.

A recliner for a vehicle according to the present disclosure includes: a mobile flange 100 opened at an upper side thereof and including a seating space formed therein, an internal gear 110 formed on an inner surface that defines the seating space, and a support portion 140 formed at a center of the seating space and protruding upward from a lower surface 120, the support portion 140 having a multistage structure having stages with different outer diameters; an eccentric ring 400 installed in the seating space of the mobile flange 100 by being fitted with the support portion 140 of the mobile flange 100, the eccentric ring 400 including a corresponding end 420 corresponding to the multistage structure of the support portion 140 and formed on an inner surface being in contact with the support portion 140; a gear plate 300 disposed in the seating space of the mobile flange 100 and including an external gear 310 formed on an outer peripheral surface thereof, the external gear 310 being configured to engage with the internal gear 110 of the mobile flange 100; and cams 490 disposed between the eccentric ring 400 and the gear plate 300 and configured to press the gear plate 300 to one side.

The recliner needs to have a mobile flange as a basic component. The mobile flange 100 is fixed to one side of a seatback or a seat cushion. The mobile flange 100 is opened at the upper side thereof and has the seating space therein. The internal gear 110 is formed on the inner surface that defines the seating space.

Meanwhile, the support portion 140 is formed at the center of the seating space of the mobile flange 100 and protrudes upward from the lower surface in the mobile flange. The support portion 140 has the multistage structure having the stages with the different outer diameters.

Further, a through-hole is formed at a center of the lower surface 120 of the mobile flange 100. The support portion 140 may extend upward from a rim of the through-hole. That is, the support portion 140 of the mobile flange 100 may be formed integrally with the mobile flange 100 by a fine blanking process.

The mobile flange 100 may be formed by various processes. Examples of the processes may include casting, cold forging, or fine blanking. In the case of the present disclosure, it is possible to ensure sufficient strength while applying the fine blanking process.

Meanwhile, the support portion 140 of the mobile flange 100 includes a lower end 142, and an upper end 144 disposed at an upper side of the lower end 142. The lower end 142 may have a larger outer diameter than the upper end 144. Specifically, the through-hole may be formed at the center of the lower surface of the mobile flange 100, the lower end 142 may be formed inside the through-hole, and the upper end 144 may be formed inside the lower end 142.

As illustrated, the through-hole may be formed at the center of the lower surface 120 of the mobile flange 100, the lower end 142 may be formed at a point offset upward in the through-hole, and the lower end 142 protrudes from the lower surface 120 of the mobile flange 100. The upper end 144 may be formed at a point offset upward in the lower end 142, and the upper end 144 may protrude upward from the lower end 142. That is, because the multistage structure is implemented as described above, the shape capable of improving the sufficient strength may be implemented even by fine blanking.

Moreover, in this case, a lowermost end of the mobile flange 100 has a flat plate shape. Therefore, it is possible to ensure a sufficient material for forming the multiple stages and reduce the weight.

In general, the most important factor related to the moment of force and strength of the recliner is a tooth size and a thickness of the support portion (burring shape). Therefore, it is essential to increase the tooth size and the thickness of the support portion to ensure high strength while meeting the recent requirement for a slim design. The use of the fine blanking process may easily increase the thickness of the tooth by increasing the thickness of the material. However, it is impossible to ensure the support portion having a predetermined thickness or more because of a limitation of the process (an insufficient burring shape volume). For this reason, a comparatively expensive and complicated process, such as cold forging, is inevitably used.

To solve the above-mentioned problem, according to the present disclosure, the two stages are added to the support portion, such that the outer diameter of the support portion increases, and an overall thickness D of the support portion increases. Therefore, a lateral supporting force further increases in comparison with that in the related art, and an effect of transmitting a load to the tooth increases while causing almost no deformation of the support portion, such that overall strength is improved.

Meanwhile, FIG. 3 is a view illustrating the eccentric ring 400 of the recliner for a vehicle according to the embodiment of the present disclosure and illustrating the eccentric ring 400 when viewed from below. The eccentric ring 400 is disposed in the seating space of the mobile flange 100, and the inner surface of the eccentric ring 400 is in contact with the support portion. The corresponding end 420 corresponding to the multistage structure of the support portion 140 is formed on the inner surface of the eccentric ring 400. That is, as illustrated, the corresponding end 420 is formed as a part of an inner lower end of the eccentric ring 400 is recessed in a ring shape. Further, an eccentric portion 440 protrudes from one side of the eccentric ring 400. The gear plate 300 engages with the mobile flange 100 in an eccentric state as the eccentric portion 440 is pressed by the cams 490.

The corresponding end 420 may be formed as a lower portion of the inner surface of the eccentric ring 400, which adjoins the support portion 140, is recessed. A lateral surface 422 of the corresponding end 420 of the eccentric ring 400 may be offset outward in a radial direction from an inner end 402 of the eccentric ring 400. Further, the lateral surface 422 of the corresponding end 420 of the eccentric ring 400 and the inner end 402 of the eccentric ring may face lateral surfaces of the multistage structure of the support portion 140, respectively.

That is, as illustrated in FIG. 4, the lateral surface 422 of the corresponding end 440 of the eccentric ring 400 and the inner end 402 of the eccentric ring 400 face the lateral surfaces of the multistage structure 142 and 144 of the support portion, respectively, such that the eccentric ring 400 and the support portion 140 are stably in surface contact with each other at the two points. Therefore, it is possible to basically suppress distortion occurring in the related art and thus prevent in advance a defect, noise, a deterioration in strength, and the like caused by the point contact.

Further, with this structure, at least any one of the surface contact between the lateral surface 422 of the corresponding end 420 of the eccentric ring and the lower end 142 of the support portion and the surface contact between the inner end 402 of the eccentric ring and the upper end 144 of the support portion is always is implemented even though numerical values of some components are not correct or some components are deformed. Therefore, the stable strength may be ensured, the operation may be smoothly performed, and the durability may be improved.

Further, the recliner to which the present disclosure is applied has the gear plate 300. The gear plate 300 is disposed in the seating space of the mobile flange 100 and surrounds outer portions of the cams 490. The external gear 310 is formed on the outer peripheral surface of the gear plate 300. The gear plate 300 is eccentrically pressed by the cams 490, such that the external gear 310 engages with the internal gear 110 of the mobile flange 100. Further, an input device 500 is inserted. When the input device rotates, the eccentric ring 400 rotates, and the cams 490 are pressed to one side in a rotation direction and perform the eccentric pressing. Further, at normal times, a pair of cams are separated by a spring 600 to implement braking, and the components are finally covered and protected by a retainer 700 and a cap 800.

According to the recliner for a vehicle according to the present disclosure, the multistage structure may be formed, by a comparatively simple process, on the support portion for supporting the eccentric ring of the mobile flange, and the corresponding end structure may also be formed on the corresponding eccentric ring, thereby increasing strength of the recliner, reducing weight and size, and reducing manufacturing costs.

While the specific embodiments of the present disclosure have been illustrated and described, it will be obvious to those skilled in the art that the present disclosure may be variously modified and changed without departing from the technical spirit of the present disclosure defined in the appended claims.

What is claimed is:

1. A recliner for a vehicle, the recliner comprising:
a mobile flange opened at an upper side thereof and including a seating space formed therein, an internal gear formed on an inner surface that defines the seating space, and a support portion formed at a center of the seating space and protruding upward from a lower surface, the support portion having a multistage structure having stages with different outer diameters;
an eccentric ring installed in the seating space of the mobile flange by being fitted with the support portion of the mobile flange, the eccentric ring including a corresponding end corresponding to the multistage structure of the support portion and formed on an inner surface being in contact with the support portion;
a gear plate disposed in the seating space of the mobile flange and including an external gear formed on an outer peripheral surface thereof, the external gear being configured to engage with the internal gear of the mobile flange; and
a cam disposed between the eccentric ring and the gear plate and configured to press the gear plate to one side.

2. The recliner of claim 1, wherein a through-hole is formed at a center of the lower surface of the mobile flange, and the support portion extends upward from a rim of the through-hole.

3. The recliner of claim 1, wherein the support portion is formed integrally with the mobile flange through a fine blanking process.

4. The recliner of claim 1, wherein the support portion includes a lower end, and an upper end disposed at an upper side of the lower end, and the lower end has a larger outer diameter than the upper end.

5. The recliner of claim 4, wherein a through-hole is formed at a center of the lower surface of the mobile flange, the lower end is formed inside the through-hole, and the upper end is formed inside the lower end.

6. The recliner of claim 4, wherein a through-hole is formed at a center of the lower surface of the mobile flange,
wherein the lower end is formed at a point offset upward in the through-hole to protrude upward from the lower surface of the mobile flange, and
wherein the upper end is formed at a point offset upward in the lower end to protrude upward from the lower end.

7. The recliner of claim 1, wherein a lower end of the mobile flange has a flat plate shape.

8. The recliner of claim 1, wherein the corresponding end of the eccentric ring is formed as a lower portion of the inner surface of the eccentric ring, which adjoins the support portion, and is recessed.

9. The recliner of claim 8, wherein a lateral surface of the corresponding end of the eccentric ring is offset outward in a radial direction from an inner end of the eccentric ring.

10. The recliner of claim 8, wherein a lateral surface of the corresponding end of the eccentric ring and an inner end of the eccentric ring face lateral surfaces of the multistage structure of the support portion, respectively.

11. The recliner of claim 10, wherein the corresponding end of the eccentric ring has a ring shape formed as an inner lower portion of the eccentric ring and is recessed.

\* \* \* \* \*